May 9, 1961 L. J. RUEGER 2,983,884

TRANSMISSION LINE MATCHING STRUCTURE

Filed July 1, 1957 2 Sheets-Sheet 1

INVENTOR
LAUREN J. RUEGER

BY Harold T. Stowell
Harold L. Stowell

ATTORNEYS

May 9, 1961 L. J. RUEGER 2,983,884

TRANSMISSION LINE MATCHING STRUCTURE

Filed July 1, 1957 2 Sheets-Sheet 2

INVENTOR
LAUREN J. RUEGER

BY Harold T. Stowell
Harold L. Stowell

ATTORNEYS 2,983,884

TRANSMISSION LINE MATCHING STRUCTURE

Lauren J. Rueger, Silver Spring, Md., assignor to Research Corporation, New York, N.Y., a corporation of New York Filed July 1, 1957, Ser. No. 669,007

4 Claims. (Cl. 333—33)

This invention relates to matching structures for reducing radiation losses at junctions between electric transmission lines having differing field patterns.

It broadly comprises means adjacent the junction between transmission lines of differing field patterns providing a conductive surface shaped to transform the electric field pattern of one of the lines to the electric field pattern of the other of the lines.

The matching structures of the invention are particularly useful in reducing radiation losses at junctions between two-conductor transmission lines, such as coaxial lines, Lecher lines and the like, and "Microstrip" lines (including printed circuits).

In a modified embodiment, the invention contemplates a matching structure having a conducting surface shaped to produce reflections of such phase that compensation for standing waves present on one of the transmission lines, introduced by an imperfect termination device such as a crystal, will be effected.

A particularly advantageous form of the invention comprises the provision of a conductive disk at the junction end of the "Microstrip" extending in a plane substantially normal to the two-conductor transmission line.

The matching structures of the invention can be used with pulsed or alternating currents in the range of zero mc. (i.e., near D.C.) to 100,000 mc. and, in general, are useful in any circuit in which "Microstrip" transmission lines can be used.

The invention will be more particularly described with reference to the illustrative embodiments shown in the accompanying drawings, in which.

Figure 1:
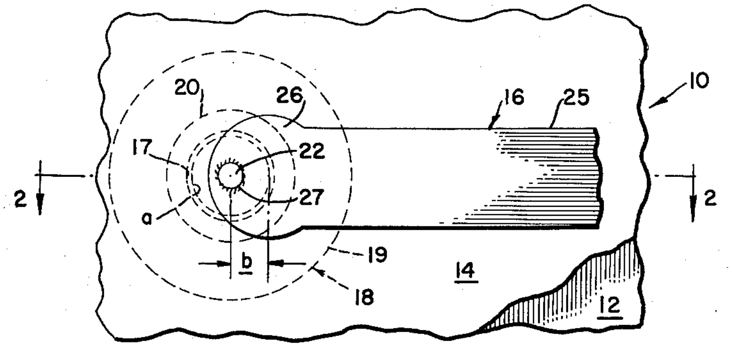
Fig. 1 is a bottom plan view of a junction between a microwave strip and a coaxial line embodying the matching structure of the invention.
Figure 2:
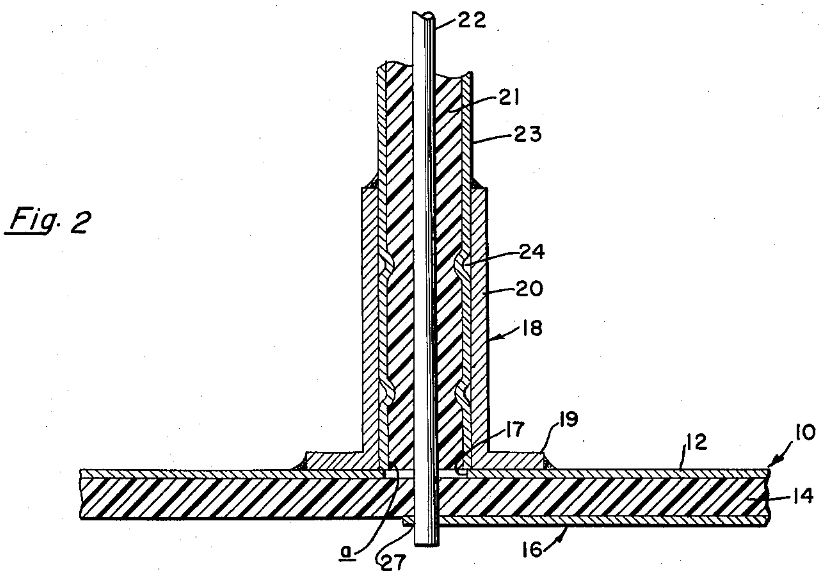
Fig. 2 is a section elevation of the junction on line 2—2 of Fig. 1.

Referring to the drawings, and first to Figs. 1 and 2 thereof, the numeral 10 indicates a portion of a conductor strip, such as "Microstrip," the same comprising a ground plane element 12, a dielectric member 14 and a conductor element 16. The elements 12 and 16 are preferably copper, suitably 0.0014" thick. Formed in the ground plane element is a circular opening 17 and mounted on the element 12 in a position surrounding the opening is a shield 18. The shield consists of a base flange 19, which has its edge soldered to the surface of said element 12, and a tubular body 20.

The shield 18 receives one end of a coaxial line 21, consisting of an axial conductor 22, a tubular dielectric and a metallic outer conductor or sheath 23. As best seen in Fig. 2, the coaxial line is secured in the shield 18 with the end of the sheath in engagement with the ground plane element 12 adjacent the opening 17. Indentations 24 are formed in the sheath 23, conveniently by crimping, to prevent axial displacement of the dielectric at the end of the line 21. Since a single indentation or a series of improperly spaced indentations would produce standing waves which would tend to move along the line, two indentations are employed and are spaced one quarter wavelength at the operating frequency for cancelling out any such standing waves.

The center conductor 22 of the coaxial line 21 is passed through an opening, formed in the dielectric member 14 axially of the opening 17, and projects a short distance, say 0.031", beyond said member. As best seen in Fig. 1, the conductor element 16 consists of a flat strip 25 which terminates in a subcircular matching member 26. The junction end of the conductor element 16 is electrically connected to the end of the conductor 22, for example, by soldering as indicated at 27.

For a band centered at about 6000 mc., the following dimensions of the conductor elements are appropriate:

| | Inches |
|---|---|
| Width of conductor element **16** | 0.150 |
| Diameter of conductor **22** | 0.035 |
| Internal diameter *a* of sheath **23** at junction | 0.120 |
| Diameter of matching member **26** | 0.187 |
| Distance of center *b* of matching member from center of conductor **22** | 0.060 |

By the provision of matching member 26 as described above, the voltage standing wave ratio, which is a measure of the effectiveness of the matching, is reduced from more than 1.2 to less than 1.05 over a 5% bandwidth centered at 6000 mc.

The matching structures of the invention occupy less space and excite less radiation than impedance matching devices heretofore used such as offset stubs, conducting posts and series or shunt transmission line sections of various impedance characteristics.

It will be appreciated that the matching technique of the invention is applied at the junction itself and effects the matching by changing or transforming the electric field patterns within the fringing field which for all practical purposes is confined to distances of less than one-quarter wave length from the junction.

Figure 3:
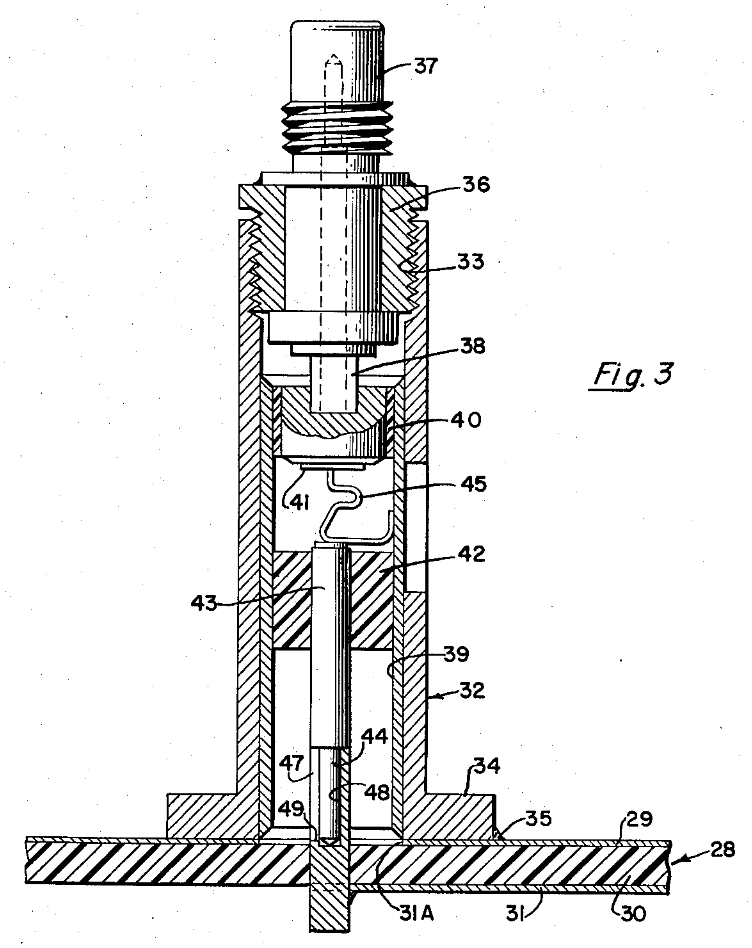
Fig. 3 is a sectional view of a modified embodiment of the invention.
Figure 4:
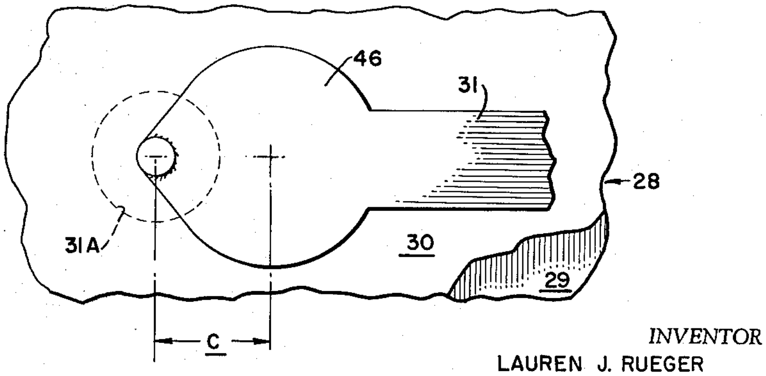
Fig. 4 is a bottom plan view of the matching member forming a part of the embodiment shown in Fig. 3.

Referring now to the modified embodiment of the invention illustrated in Figs. 3 and 4 of the drawings, there is shown a junction between a conductor strip and a coaxial line terminated in a crystal. In Fig. 3, the conductor strip is shown at 28 and includes a ground plane element 29, a dielectric member 30 and a conductor element 31, the element 29 being formed with a circular opening 31A. Surrounding the opening 31A is a shield 32 which has an internally threaded outer end portion 33 and a flange 34, the latter being secured to the ground plane element 29 in a position surrounding the opening 31A, as by soldering, as shown at 35.

The upper end of the shield 32 is closed by a silver plated brass sleeve 36, screwed in the threaded upper end 33. The sleeve 36 carries a male connector 37 which extends therethrough and terminates in a plug 38. The male connector 37 receives a female end connector of a coaxial line of the miniature type, such as "Subminax" (not shown). Positioned within the shield is a metallic liner 39 which forms a part of a crystal assembly and which has a bevelled inner end engageable with the rim of the opening 31A and an outer end terminating inwardly of the threaded outer end portion 33. An insulating bushing 40 is fitted in the outer end of the liner 39 and carries a microwave crystal 41. An insulating spacer 42 centers a contactor 43 within the liner, said contactor terminating in a pin 44. A contact wire 45 extends from the crystal 41 into engagement with the outer face of the contactor 43 and has its free end secured to the liner 39. The crystal assembly, which is of the tripolar type, is of known design and accordingly forms no part of the present invention. It includes, in addition to the liner 39, elements 40, 41, 42, 43, 44 and 45.

As best seen in Fig. 4, the conductor element 31 includes a subcircular matching member 46 which terminates substantially opposite the opening 31A. A socket element 47, counterbored as shown at 48 and slotted at 49, is soldered to the member 46 near its rim and opposite the element 31A. The socket element extends through the dielectric member 30 and into the liner 39, to receive the pin 44.

As will be apparent, the introduction of the crystal and its associated parts will produce standing waves on the coaxial line. Accordingly, provision must be made to compensate for such standing waves and this is effected by shaping the matching member 46 to produce reflections of such phase that the standing waves will be cancelled out. The radiation of any standing waves is reduced to practically zero by reason of the connection between the liner 39 and the rim of the opening 31A in the ground plane element 29 and the connection between the shield 32. That is, the only radiation that could take place would be confined by the dielectric member 30.

The dimensions of the critical parts, for a band centered at about 6000 mc., are as follows:

| | Inches |
|---|---|
| Width of conductor element **31** | 0.150 |
| Diameter of contactor **43** and socket element **47** | 0.062 |
| Internal diameter of liner **39** | 0.200 |
| Diameter of matching member **46** | 0.344 |
| Distance of center *c* of matching member from center of element **47** | 0.175 |

By the provision of matching member 46 as described above, the voltage standing wave ratio, which is a measure of the effectiveness of the matching, is reduced from more than 5 to less than 1.2 over a 2% bandwidth centered at 6000 mc.

As will be evident to those skilled in the art, means other than crystals are often used at junctions and produce their own variety of standing waves on connecting coaxial lines. Each such means requires a specially dimensioned matching member 46 to compensate for the standing waves it produces. It will accordingly be understood that the invention is not limited to the particular shape or relationship of matching structure shown by way of illustration but comprises conductive members of other configurations, which may be integral with either of the transmission lines to be joined or otherwise electrically connected thereto to effect a smooth transformation of field patterns between the lines at the junction.

I claim:

1. In combination with a junction between a coaxial transmission line and a conductor strip transmission line, a substantially circular conductive member within the fringing field of the junction and extending normal to the axis of the coaxial line, said member electrically connecting the conductor strip line with the axial member of the coaxial line, the point of connection of said conductive member with the axial member of the coaxial line being offset from the center of said conductive member in the direction of approach of the conductor strip line to the junction whereby said member effectively transforms the electric field pattern of the coaxial line to the electric field pattern of the conductor strip at the junction.

2. A matching structure including a conductor strip having a ground plane element, a dielectric member and a conductor element, said ground plane element having an opening, a coaxial transmission member having an outer conductor connected to the ground plane element about the opening and an axial conductor projecting through the dielectric member, and means including a subcircular matching member on the conductor element to provide an electrical junction between the conductor strip and the coaxial transmission member, said means being disposed within the fringing field of said junction and being so shaped that radiation from said junction will be reduced to a minimum by transforming the electric field patterns of the conductor strip to the electric field patterns of the coaxial transmission member.

3. In combination, a coaxial line terminating in a device tending to produce discontinuities in said line, a conductor strip including a ground plane element, a conductor element and a dielectric member between said elements, and means for producing reflections compensating for such discontinuities and transforming the electric field patterns of the coaxial line to the electric field pattern of the conductor strip whereby radiation from a junction between said device and said strip will be reduced to a minimum, said means being disposed within the fringing field of the junction.

4. In combination, a conductor strip having a ground plane element, a conductor element and a dielectric member between the elements, a coaxial transmission member having a sheath connected to the ground plane element, a tubular dielectric and an axial conductor extending through the dielectric member, a matching member on the conductor element, means connecting the matching member to the axial conductor, said matching member providing an electrical match at the junction of the conductor strip and the coaxial transmission member by transforming the electric field pattern of the conductor strip and the electric field pattern of the coaxial transmission member, said sheath having indentations for preventing axial displacement of the tubular dielectric, said indentations being spaced from each other one quarter wavelength at the operating frequency for preventing standing waves produced by said indentations from passing along said transmission member, and a shield surrounding the sheath about the indentations and connected to said sheath and to the ground plane element.

References Cited in the file of this patent

UNITED STATES PATENTS

| | | |
|---|---|---|
| 2,165,961 | Cork et al. | July 11, 1939 |
| 2,348,641 | Parker | May 9, 1944 |
| 2,538,771 | Feenberg | Jan. 23, 1951 |
| 2,734,170 | Engelmann et al. | Feb. 7, 1956 |
| 2,794,174 | Arditi et al. | May 28, 1957 |

FOREIGN PATENTS

| | | |
|---|---|---|
| 635,763 | Great Britain | Apr. 19, 1950 |